US 6,725,723 B2

(12) United States Patent
Aronsson et al.

(10) Patent No.: US 6,725,723 B2
(45) Date of Patent: *Apr. 27, 2004

(54) DEVICE FOR MOUNTING ON A MACHINE

(75) Inventors: Carsten Aronsson, Strangnas (SE); Jarl-Ove Lindberg, Strangnas (SE)

(73) Assignee: SPM Instrument AB, Strangnas (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/252,388

(22) Filed: Sep. 24, 2002

(65) Prior Publication Data

US 2003/0018439 A1 Jan. 23, 2003

Related U.S. Application Data

(62) Division of application No. 09/214,291, filed as application No. PCT/SE97/01221 on Jul. 4, 1997, now Pat. No. 6,499,349.

(30) Foreign Application Priority Data

Jul. 5, 1996 (SE) ................................................ 9602694

(51) Int. Cl.[7] ............................................. G01H 11/08
(52) U.S. Cl. ............................ 73/659; 73/660; 73/593; 702/56; 702/77
(58) Field of Search ............................. 73/659, 660, 661, 73/593; 702/56, 77; 340/683

(56) References Cited

U.S. PATENT DOCUMENTS 3,848,112 A    11/1974    Weichselbaum et al.
3,913,084 A    10/1975    Bollinger et al.
4,121,574 A    10/1978    Lester
4,280,185 A     7/1981    Martin ........................ 701/99
4,408,285 A    10/1983    Sisson et al.
4,426,641 A     1/1984    Kurihara et al.

(List continued on next page.)

FOREIGN PATENT DOCUMENTS

DE      33 14 005      2/1984
DE       3915126      11/1990
DE      44 27 880      2/1996
EP       0194333      9/1986
WO       95/00930      1/1995
WO       99/05486      2/1999

Primary Examiner—Hezron Williams
Assistant Examiner—Rose M. Miller
(74) Attorney, Agent, or Firm—Young & Thompson

(57) ABSTRACT

The invention relates to a method for evaluating the condition of a machine (100) with a measuring point (90), which method is performed by a movable analysis apparatus (30). The method comprises the steps of producing a condition value, by means of measuring at the measuring point, which condition value is dependent on the actual condition of the machine, and storing the condition value in a writable information carrier (120) which is placed by, or in the vicinity of, the measuring point (90) so that the condition value subsequently can be used as a reference condition value. The invention further relates to an apparatus for performing the method and a device for cooperating with the analysis apparatus and for mounting by a measuring point on the machine (100).

42 Claims, 2 Drawing Sheets

U.S. PATENT DOCUMENTS

| | | | |
|---|---|---|---|
| 4,520,674 A | 6/1985 | Canada et al. | 73/660 |
| 4,530,240 A * | 7/1985 | Board et al. | 73/593 |
| 4,550,311 A | 10/1985 | Galloway et al. | |
| 4,559,828 A * | 12/1985 | Liszka | 73/658 |
| 4,612,620 A | 9/1986 | Davis et al. | |
| 4,615,216 A | 10/1986 | Vykoupil | |
| 4,621,263 A | 11/1986 | Takenaka et al. | |
| 4,669,315 A | 6/1987 | Sato et al. | |
| 4,721,849 A | 1/1988 | Davis et al. | |
| 4,768,380 A | 9/1988 | Vermeiren et al. | |
| 4,800,512 A | 1/1989 | Busch | 702/182 |
| 4,827,771 A | 5/1989 | Cary et al. | |
| 4,885,707 A | 12/1989 | Nichol et al. | 702/56 |
| 5,162,725 A | 11/1992 | Hodson et al. | |
| 5,191,327 A | 3/1993 | Talmadge et al. | |
| 5,206,818 A | 4/1993 | Speranza | 702/24 |
| 5,251,151 A | 10/1993 | Demjanenko et al. | |
| 5,257,208 A | 10/1993 | Brown et al. | |
| 5,319,962 A | 6/1994 | Kaminski et al. | 73/116 |
| 5,335,186 A * | 8/1994 | Tarrant | 702/127 |
| 5,377,128 A | 12/1994 | McBean | |
| 5,379,643 A | 1/1995 | Taylor | |
| 5,430,663 A | 7/1995 | Judd et al. | |
| 5,479,359 A | 12/1995 | Rogero et al. | |
| 5,501,105 A | 3/1996 | Hernandez et al. | |
| 5,511,422 A | 4/1996 | Hernandez | |
| 5,515,266 A | 5/1996 | Meyer | 700/79 |
| 5,517,183 A | 5/1996 | Bozeman, Jr. | |
| 5,530,343 A | 6/1996 | Bowers, III et al. | |
| 5,533,413 A | 7/1996 | Kobayashi et al. | |
| 5,544,073 A | 8/1996 | Piety et al. | |
| 5,555,457 A | 9/1996 | Campbell et al. | |
| 5,579,241 A | 11/1996 | Corby, Jr. et al. | |
| 5,584,796 A | 12/1996 | Cohen | |
| 5,586,305 A | 12/1996 | Eidson et al. | |
| 5,663,811 A | 9/1997 | Shimizu | |
| 5,808,903 A * | 9/1998 | Schiltz et al. | 702/56 |
| 5,992,237 A | 11/1999 | McCarty et al. | 73/659 |
| 6,006,164 A | 12/1999 | McCarty et al. | 702/56 |
| 6,078,874 A | 6/2000 | Piety et al. | 702/122 |
| 6,202,491 B1 | 3/2001 | McCarty et al. | 73/659 |
| 6,208,944 B1 * | 3/2001 | Franke et al. | 702/56 |
| 6,499,349 B1 * | 12/2002 | Aronsson | 73/659 |

* cited by examiner

DEVICE FOR MOUNTING ON A MACHINE

This application is a divisional of Ser. No. 09/214,291 Jan. 4, 1999 U.S. Pat. No. 6,499,349 which is a 371 of PCT/SE97/01221 Feb. 4, 1997.

TECHNICAL FIELD

The present invention relates to a device for co-operating with a machine condition analysis apparatus, and to a method of operating such a device. The invention also relates to a kit of parts comprising such a device, and to a system for evaluating the condition of a machine.

STATE OF THE ART

Machines with moving parts are subject to wear with the passage of time, which often causes the condition of the machine to deteriorate. Examples of such machines with movable parts are motors, pumps, generators, compressors, lathes and CNC-machines. It is known to, more or less regularly, investigate the operating condition of such machines. The operating condition can be determined by measuring the amplitude of vibrations in a bearing and by measuring temperature changes on the casing of the machine, which temperatures are dependent on the operating condition of the bearing. Such condition checks of machines with rotating or other moving parts are of great significance for safety and also for the length of the life of such machines. It is known to perform such measurements on machines completely manually. This ordinarily is done by an operator with the help of a measuring instrument performing measurements at a number of measuring points on a machine. The measuring data obtained by means of the measuring instrument for each measuring point is noted down on a pre-printed form. For a machine it can be necessary to have a number of measuring points in order to later be able to determine the overall operating condition of the machine. For example, three measuring points are often used for the measurement of vibrations of a motor, in such a way that the vibrations are measured in three mutually perpendicular directions, i.e. in the X-direction, in the Y-direction and in the Z-direction. The operator must note down each measured value on the form. It is furthermore necessary for the operator to evaluate the measured values so that he can make a judgement on whether the measured amplitude measurement values indicate a change for a measuring position so that the machine can be serviced if the measured values indicate wear. This places a large demand on the professional knowledge of the service personnel of which vibration and temperature measurement values are acceptable and which measurement values are not acceptable.

In order to identify damage to bearings it is known to use a shock impulse measur-ing apparatus by means of which damage to bearings can be determined in machines with rotating machine parts. In order to perform such measurements at a measuring point, the diameter of the shaft and the rotational speed of the shaft are set on a measuring scale. These values, which are set by hand, function as a reference level. If the measured values measured by means of the measuring instrument are greater than the reference level, this can be indicated by means of a warning lamp or by means of a sound signal.

It is known from EP-0 194 333 to provide each measuring point with identity data which is automatically readable by means of a separate reading probe. EP-0 194 333 also describes that the characteristic data values for the measuring point are readable at the measuring point so that the above described reference value can be generated automatically. The reference value is consequently calculated in a standardized and unambiguous way from the characteristic data values. Consequently, according to this known technique, the one and the same reference value is valid for all bearings with a certain shaft diameter and a certain rotational speed.

EP-0 211 212 describes a measuring instrument for detecting and evaluating data representative of the condition of a machine. The described measuring instrument has a measuring probe which is combined with a sensor probe for reading a measuring point code, whereby the measuring probe and the code, sensing probe are provided in a common mobile casing.

DISCLOSURE OF THE INVENTION

The problem to be solved by the present invention is to enable an increased accuracy in detecting changes of the condition of a machine.

This problem is solved according to the invention by a method of operating a device which is firmly mounted on or at a measuring point on a machine with a movable part. The device has a connection coupling to which a sensor unit is removably attachable for coupling machine vibrations to said sensor unit; an information carrier comprising a writable and readable memory means; and a communications means for co-operating with the information carrier and for communicating with an analysis apparatus. The method comprises the steps of:

a) attaching a sensor unit to said connection coupling for producing a first condition value by performing a measurement; said first condition value being dependent on the actual condition of the machine;

b) receiving said first condition value via said communications means; and c) storing said first condition value in said writable and readable memory means.

The first condition value can subsequently be used as a reference condition value. With the object of providing a determination of whether some measurable condition change is present, a method according to an embodiment of the invention comprises the steps of:

a) attaching a sensor unit to said connection coupling for producing a second actual condition value at a time point later than the time of production of said first condition value, said second actual condition value being dependent on the actual condition at the measuring point;

b) delivering said first condition value from the information carrier, via said communications means so that the first condition value can be used as a reference condition value, whereby possible condition changes can be determined by comparing said second actual condition value with said first reference condition value.

An embodiment of the invention relates to a device for co-operating with a machine condition analysis apparatus, the device being adapted to be firmly mounted on or at a measuring point on a machine. The device comprises a connection coupling to which a sensor unit is removably attachable for coupling machine vibrations to said sensor unit; an information carrier comprising a writable memory means so that storing of a local reference condition value is made possible; and a) a communications means for co-operating with the information carrier and for communicating with the analysis apparatus.

A condition analysing system, comprises:

a) a movable analysis apparatus and a sensor unit for producing a condition value by means of measuring at a measuring point on a machine, said condition value being dependent on movement and indicative of the actual condition of the machine; and b) a device comprising an information carrier which is placed on, or in the vicinity of, a measuring point on a machine. The analysis apparatus is arranged to store the condition value in the information carrier, which is writable, so that the condition value subsequently can be used as a reference condition value.

According to an embodiment of the system, the device comprises:

a) interpretation information, stored on the information carrier, which defines technical type values for the machine and/or the movable part in such a way that the actual condition value is able to be generated dependent on an actual measured value when the measured value is interpreted in combination with the interpretation information. The device also comprises a communication means for co-operating with the information carrier and for communicating with the analysis apparatus. The device may also comprise:

b) a communication means for co-operating with the analysis apparatus, which, dependent on an activating signal, reads interpretation information from the information carrier and delivers this information to the analysis apparatus; wherein the communication means, dependent on the activation signal, reads the reference condition value from the information carrier and delivers this to the analysis apparatus thereby enabling the generation of a relation value indicating a changed condition.

The communication means comprises a transceiver for communicating with the analysis apparatus by means of radio communication or optical transmitters and optical receivers. The communication means also comprises contact means for ohmic contact between the information carrier and the analysis apparatus.

DESCRIPTION OF THE DRAWINGS

In order to make the present invention easy to understand and produce, it will be described with reference to the appended drawings.

PREFERRED EMBODIMENTS

Figure 1:
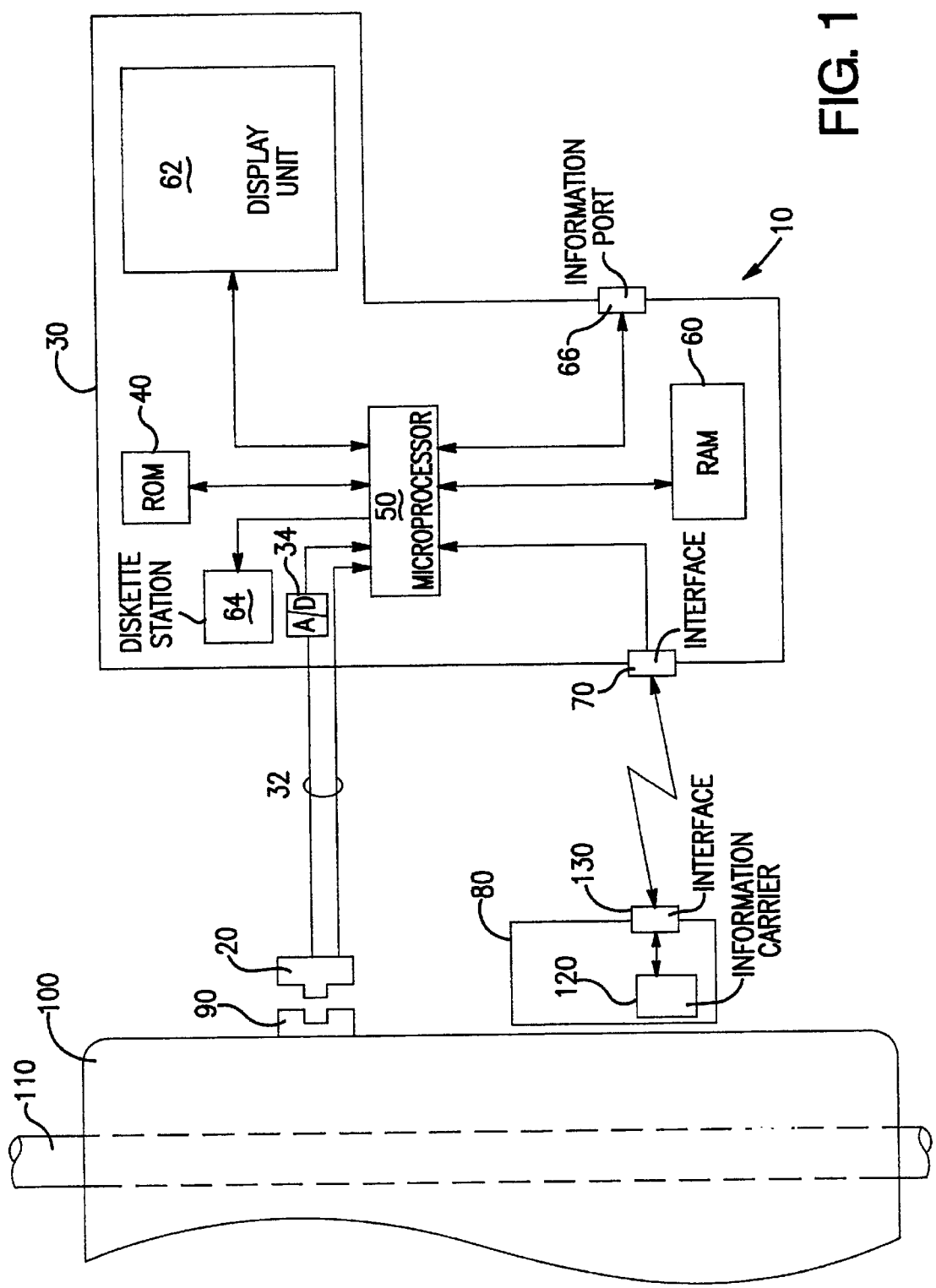
FIG. 1 shows a schematic block diagram of an embodiment of a condition analyzing system according to the invention.
Figure 2A:
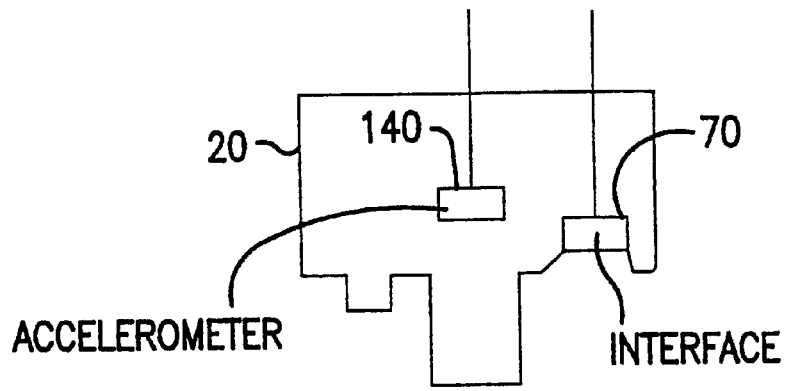
FIG. 2A shows an embodiment of a sensor unit which comprises an interface for communication with an information carrier at a measuring point.
Figure 2B:
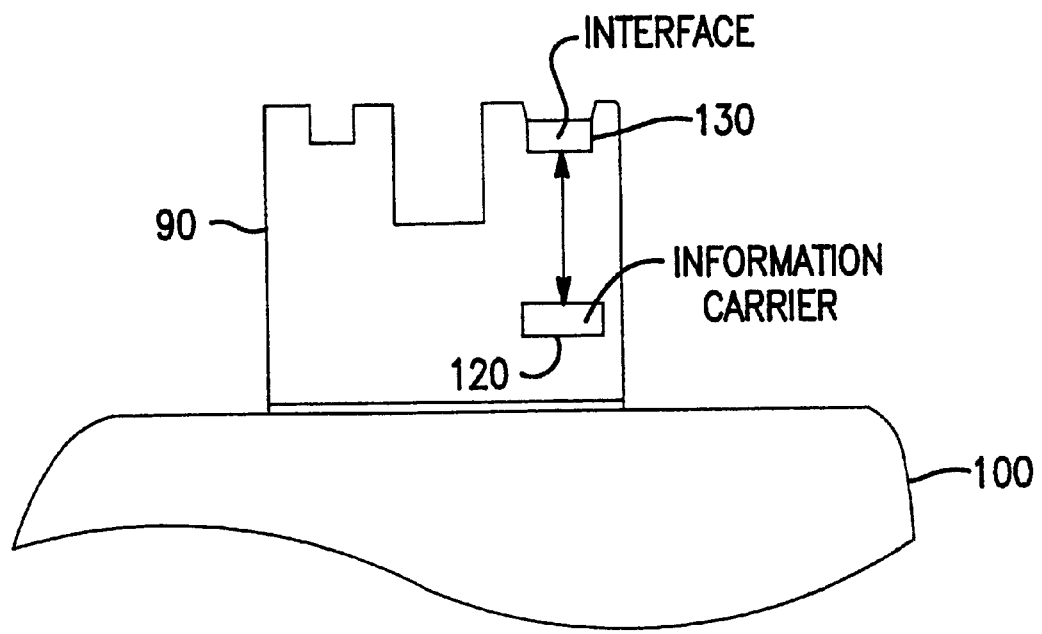
FIG. 2B shows an embodiment of a device at a measuring point comprising an information carrier and an interface for communication with the interface according to FIG. 2A.

FIG. 1 shows a schematic block diagram of an embodiment of a condition analyzing system 10 according to the invention. The condition analyzing system comprises a sensor unit 20 for producing a measured value dependent on movement and, more precisely, dependent on vibrations.

The sensor unit 20 is connected to an analysis apparatus 30 via a conductor 32. The analysis apparatus 30 comprises a non-volatile memory 40, a microprocessor 50 and a read/write memory 60. A computer program is stored in the read memory 40, and by means of this computer program the function of the analysis apparatus 30 is controlled. When it is written below that the microprocessor 50 performs a certain function, it shall be understood that the microprocessor runs a certain part of the program which is stored in the memory 40.

The microprocessor 50 is connected to a display unit 62. By means of the display unit 62 a user of the condition analyzing system is informed of the condition of the current measuring point in clear text. The production of a condition value is described more closely below. The display arrangement can comprise, on the one hand a screen, on the other hand a printer unit, so that the user can have the condition value from the measuring point printed out if so desired.

According to a preferred embodiment the analysis apparatus 30 comprises a screen 62 on which relevant information is shown during the measuring, and a diskette station 64 in which a diskette is introduceable. In this way the user with the help of the analysis apparatus 30 collects the condition values for a plurality of measuring points and save all the information on a diskette removably introduced into the diskette unit 64. The microprocessor 50 is further connected to an information port 66, by means of which the apparatus 30 can be connected to a separate information processing unit.

The analysis apparatus 30 is equipped with an interface 70 for the exchange of data, with a device 80. When the system is operative, the device 80 is firmly mounted on or at a measuring point 90 on a machine 100 with a movable part 110. A measuring point can comprise a connection coupling firmly attached to the casing of the machine to which the sensor unit is removably attachable. The connection coupling can, for example, be formed of a bayonet coupling. A measuring point can com-prise a threaded recess in the casing in which the sensor unit is screwable. In the last case the sensor unit 20 comprises corresponding threads so that it can be introduced into the recess like a screw.

Alternatively, the measuring point is marked on the casing of the machine only with a painted mark.

The machine 100 exemplified in FIG. 1 has a rotating shaft 110 with a certain shaft diameter $d_1$. Shaft 110 in the machine 100 rotates at a certain speed of rotation $V_1$ when the machine is in use.

The apparatus 80 comprises an information carrier 120 which is equipped with in-formation on the identity of the measuring point and interpreting information. The information carrier is furthermore equipped with at least one condition value $K_{ref}$ which can be used as reference for determining a possible change in the condition.

The identity information can be formed of, for example, the identity number of the measuring point or of a data string which identifies both the machine 100 and the measuring point 90. The machine 100, which is only partly shown in FIG. 1, can comprise a number of measuring points and a number of moving parts so that the condition of different parts of the machine can be determined individually. The interpretation data stored in the measuring point device 80 can comprise a first computer word indicating the above mentioned shaft diameter $d_1$ and a second computer word indicating the speed of rotation $V_1$. The information carrier 120 is connected to an interface unit 130 for exchanging information with the interface unit 70 of the analysis apparatus 30. An operator transports the portable analysis apparatus 30 to the measuring point for which the condition value is to be determined and attaches the sensor unit 20 to the measuring point 90. According to one embodiment the sensor unit 20 is provided with a change-over switch (not shown) which closes in dependence of the sensor unit being brought into contact with the measuring point 90. When the change-over switch closes, an activating signal is produced which, via the bus 32 is delivered to the microprocessor 50 and thereby activates the microprocessor to perform an analysis routine. An actual condition value is deter-mined by the analysis routine, and a reference value $K_{ref}$ acquired from the information carrier 120. The reference value $K_{ref}$ indicates the condition value for the individual machine for the same measuring point at an earlier point of time. The reference value $K_{ref}$ is stored in the information carrier in the same way as described below.

When the machine is new from the factory or when a bearing for a rotatable shaft 110 is renovated or exchanged, a condition value $K_{ref}$ for each measuring point 90 of the machine 100 is determined.

The condition reference value for the measuring point is determined according to a preferred embodiment by producing a measured value indicating the vibration or temperature of the machine at the measuring point and, in a known way, with the help of interpretation information, such as shaft diameter and speed of rotation of the shaft, transforming the measured value into a condition value. Because this condition value $K_{ref}$ is produced when the corresponding machine part is new or newly renovated, possible later condition changes can be advantageously deter-mined by comparison with the reference $K_{ref}$.

When the apparatus 30 is used to produce the reference condition value $K_{ref}$, a key-board is connected to the information port 66 and the microprocessor is instructed to perform a reference-producing routine. The reference-producing routine involves the microcomputer 30 acquiring a measuring value from the sensor unit 20 and the display unit 62 showing a request for the operator to input the interpretation information which applies for the measuring point.

The interpretation information can be inputted, for example, via the keyboard or by means of a diskette which is introduced into the diskette station 64.

The microcomputer calculates the actual condition value $K_{ref}$ indicating the condition of the individual measuring point depending on the measured value and the inputted interpretation information.

Both the condition reference value $K_{ref}$ and the inputted interpretation information determined in this way are delivered to the information carrier 120 via the interface 70.

Alternatively, the interpretation data as well as the reference value $K_{ref}$ can be delivered to the diskette unit 64 or the display unit/screen 62 in order to be inputted to the information carrier 120 in another way.

According to a preferred embodiment of the invention the device 80 comprises a readable and writable memory 120 which can exchange information in both directions with the interface 130. According to one embodiment the device 80 comprises a photoelectric cell which provides the power supply to the memory 120 and the interface 130.

Because the device 80 in the above described way is applied with a condition reference value which is individual for the machine and for the measuring point, later condition measuring can give advantageously accurate indications about changes in the condition. This means that the analysis apparatus does not have to be provided with any information at all about the machine or its measuring point, and despite this it is still possible to achieve an accurate evaluation of whether any changes in the condition have occurred. This is of considerable advantage, for example, during the checking of the condition of machines fixed to the floor in a large manufacturing industry, where the number of machines and measuring points is very large. It further provides a very good security as the risk of mixing of the data in a data base is eliminated by the reference condition value being stored directly at the measuring point.

A method for determining a possible change in the condition is usually performed with a certain regularity by maintenance personnel. A first example of when such a process can be performed, according to the invention, is when a machine has just been installed after delivery. In this situation there is already a condition reference value in the information carrier which has been generated and stored there in connection with the final inspection at the manufacturer of the machine.

When the installator has just installed the machine, the process is performed for determining a possible change in the condition with the purpose of verifying that the installation is correct and that the condition of the machine has not deteriorated during the transport from the manufacturer.

The method comprises the steps of:
producing a measured value which depends on a movement of the machine;
acquiring interpretation information from an information carrier which is mounted by the measuring point;
producing an actual condition value, indicating the actual condition of the measuring point on the machine, dependent on the measured value and the interpretation;
acquiring a second condition value, indicating the condition of the measuring point at an earlier point of time, from the information carrier;
producing a relation value dependent on the actual condition value and the second condition value, which relation value indicates a change in the condition.

This process can be performed by the microprocessor 50 by it running an analysis routine which is stored in the memory 40.

The analysis routine comprises the step of the microprocessor 50 requesting measured values from the sensor unit 20. According to one embodiment of the invention the sensor unit comprises an accelerometer 140 with a piezo-electric element. When the measuring point 90 vibrates, the sensor unit 20, or at least a part of it, also vibrates and the accelerometer 140 then produces an electrical signal of which the frequency and amplitude depend on the mechanical vibration frequency and the vibration amplitude of the measuring point 90, respectively. The electrical signal is delivered to the analog-digital converter 34 which with a certain sampling frequency $f_s$ converts the analog signal to consecutive digital words in a known way. The microcomputer 50 stores a series of digital words which correspond to a time sequence of the electrical signal in the memory 60, and then performs an analysis of the signal sequence, whereby the frequency and amplitude of the signal is deter-mined. Consequently, a measured value for the vibration amplitude $A_v$ and the vibration frequency $f_v$ is determined. The microcomputer then takes the interpretation information and the reference value $K_{ref}$ from the device 80 by reading information from the interface 70.

According to one embodiment, the interface 130 on the device 80 comprises an opto-transmitter which transfers data serially to the interface 70 in the form of trains of pulses of infrared light.

The device 80 can be activated depending on an information request which is received via the interface 130.

Alternatively, the device 80 comprises a detector element which senses if the sensor unit 20 is applied to the measuring point 90 and then activates the device 80 to send information to the interface 130.

In this way the microcomputer receives information on the identity of the measuring point and interpretation information, such as the diameter value $d_1$ and the rotational speed value $V_1$.

With knowledge of the interpretation information $d_1$ resp. $V_1$, each measured vibration amplitude value $A_v$ can be easily converted to an actual condition value $K_a$. A predetermined interpretation algorithm is stored in the memory 40 and starting from an amplitude value $A_v$ and interpretation information, such as $d_1$ and $V_1$, the micro-computer produces a corresponding condition value $K_a$ dependent thereon. Such an interpretation algorithm is based on an embodiment of a method for producing a condition value described in the Swedish Laid-Open Document 339 576.

According to one embodiment, the interpretation algorithm is based on the machine classification standard ISO 2954.

The actual condition value $K_a$ produced and the reference condition value $K_{ref}$ acquired from the information carrier 120 are delivered to the screen 62 so that the operator can judge if the two values correspond. If $K_a$ is essentially similar to $K_{ref}$, the condition is essentially unchanged. If there is a discrepancy between the two values, then this indicates that the condition of the machine has changed.

Because the actual condition value $K_a$ according to the invention can be compared with an earlier measured condition value $K_{ref}$ for the same measuring point, an extremely accurate indication of changes is achieved. In this way, advantageously well-judged decisions can be made on when maintenance is required, which in turn leads to that the life length of the machine can be increased.

According to a preferred embodiment, the microcomputer produces a relation value in dependence of the actual condition value $K_a$ and the reference condition value $K_{ref}$.

By dividing the value $K_a$ with the reference $K_{ref}$, a relation value is achieved which gives a percentage change of the condition of the machine part or parts to which the measuring points relate. According to another embodiment the relation value is produced as the difference between the value $K_a$ and the reference $K_{ref}$.

An embodiment of the invention relates to a method for the evaluation of the condition of a machine 100 with a measuring point 90, which method is performed by a movable analysis apparatus 30. The method comprises the steps of producing a condition value by means of measuring at the measuring point, said condition value being dependent on the actual condition of the machine; and storing the condition value in a writable information carrier 120 which is placed by, or in the vicinity of, the measuring point 90 so that the condition value subsequently can be used as a reference condition value. The method may also include the steps of producing a measured value; acquiring interpretation information $d_1$, $V_1$; and generating the condition value dependent on the measured value $A_v$ and the acquired interpretation information $d_1$, $V_1$. According to an embodiment the measured value indicates a movement, such as a vibration movement, of the machine. The interpretation information $d_1$, $V_1$ may correspond to the technical type values for the machine or a part of the machine.

Another embodiment of the invention relates to a method for evaluation of the condition of a machine 100 with a measuring point 90, comprising the steps of:

a) producing a condition value, said value being dependent on the actual condition at the measuring point, and b) acquiring a reference value, indicating the condition of the machine at an earlier point of time, from an information carrier 120 which is placed by, or in the vicinity of, the measuring point 90. The method may also include the step of c) producing a relation value dependent on the actual condition value and the reference value.

According to an embodiment of the method step a) comprises the steps of:

a1) producing a measuring value by means of a measuring at the measuring point;

a2) acquiring interpretation information from the information carrier 120;

a3) generating the actual condition value K dependent on the measured value $A_v$ and the interpretation information $d_1$, $V_1$. According to another embodiment of the method the condition value is produced directly be means of measuring at the measuring point.

In one version of the method embodiments described above the communication between the analysis apparatus and the information carrier is performed by means of radio communication or by means of optical transmitters and optical receivers.

The invention also relates to an analysis apparatus for evaluation of the condition of a machine 100 with a measuring point 90, which apparatus comprises: a sensor means 20 for producing a measured value $A_v$ dependent on a movement of the machine; a communication means 70;66;64 for receiving interpretation information specific to the measuring point; an information processing means 50,40,60 for producing a condition value, whereby the information processing means 50,40,60 co-operates with the communication means 70;66;64 and the sensor means 20 so that the information processing means produces a condition value K;$K_{ref}$, dependent on the measured value and the interpretation information, indicating the actual condition of the machine. The communication means comprises an interface means 70 which is arranged to transmit the condition value $K_{ref}$ to a writable information carrier 120 by, or in the vicinity of, the measuring point 90 so that it can be used as a locally stored individual condition reference value.

The invention also relates to an analysis apparatus for evaluation of the condition of a machine 100 with a measuring point 90, which apparatus comprises: a sensor means 20 for producing a measured value $A_v$ dependent on a movement of the machine; a communication means 70;66;64 for receiving interpretation information specific to the measuring point; an information processing means 50,40,60 for producing a condition value, whereby the information processing means 50,40,60 co-operates with the communication means 70;66;64 and the sensor means 20 so that the information processing means dependent on the measured value and the interpretation information produces a condition value K;$K_{ref}$ indicating the actual condition of the machine. The communication means comprises an interface means 70 which is arranged to acquire a condition reference value indicating the condition of the machine at the measuring point at an earlier point of time, from an information carrier 120 placed by, or in the vicinity of, the measuring point 90.

The interface means 70 of the analysis apparatus may be capable of both receiving and transmitting information.

According to an embodiment of the analysis apparatus the sensor means 20 is movably connected to the information processing means. In one version of this embodiment the interface means 70 and the sensor means 20 are integrated in a common casing.

According to an embodiment of the analysis apparatus the information processing means 50,40,60 by means of the communication means 70 is arranged to acquire the reference condition value, indicating the condition of the measuring point at an earlier point of time, from the information carrier; and thereafter the information processing means 50,40,60 is arranged to produce a relation value dependent on the actual condition value and the reference condition value, which relation value indicates a changing condition.

The analysis apparatus may be arranged to generate the condition value in accordance with a predetermined algorithm. Moreover, the analysis apparatus may be a portable unit. Additionally the interface means 70 of the analysis apparatus may be adapted to communicate with the information carrier by means of radio communication or by means of optical senders and optical receivers.

The invention also relates to a device for co-operating with an analysis apparatus as described above. The device is suitable for mounting at a measuring point on a machine 100 with a movable part 110, and an embodiment of the device comprises:

an information carrier 120 and interpretation information, stored on the information carrier, which defines technical type values for the machine and/or the movable part in such a way that an actual condition value is able to be generated depending on an actual measured value when the measured value is interpreted in combination with the interpretation information; wherein the information carrier comprises a writable memory means so that storing of a local reference condition value is made possible.

An embodiment of the device comprises a communication means 130 for cooperating with the information carrier 120 and for communicating with the analysis apparatus 30.

The communication means 130 is suitable for cooperating with the analysis apparatus, and according to an embodiment the communication means 130, dependent on an activating signal, is arranged to read interpretation information from the information carrier and deliver this information to the analysis apparatus; whereby the information carrier is provided with a reference condition value indicating the condition of the measuring point at an earlier point of time; and the communication means, dependent on the activation signal, reads the reference condition value from the information carrier and delivers this to the analysis apparatus thereby enabling the generation of a relation value indicating a changed condition.

In an embodiment of the device the communication means 130 comprises a transceiver for communicating with the analysis apparatus 30 by means of radio communication or optical transmitters and optical receivers. According to another embodiment the communication means 130 comprises contact means for ohmic contact between the information carrier 130 and the analysis apparatus 30,70.

According to an embodiment of the device the information carrier is adapted to be rigidly mounted on a machine.

What is claimed:

1. A system for analyzing a condition of a machine having moving parts, said system comprising:
   a.) a measuring point attached to the machine, the measuring point comprising:
      a means for storing data;
      a connector; and
      a first means for transmitting and receiving data connected to the means for storing data; and
   b.) an analysis apparatus comprising:
      a means for transferring vibrations of the machine to the analysis apparatus;
      a means for converting the vibrations into vibration data;
      a second means for transmitting and receiving data arranged to allow bi-directional communication with the first means for transmitting and receiving data;
      a means for allowing entry by a user of characteristic data that define technical type values for at least one of the moving parts of the machine; and
      a means for processing data connected to the means for converting the vibrations, the second means for transmitting and receiving data, and the means for allowing entry of the characteristic data;
      wherein the means for processing data is programmed to transmit the characteristic data enterd by the user through the first and second means for transmitting and receiving data to the means for storing data on the measuring point.

2. The system of claim 1, wherein the means for processing data is further programmed to retrieve the characteristic data stored in the means for storing data, generate a first condition value using the characteristic data and the vibration data, and store the first condition value in the means for storing data.

3. The system of claim 2, wherein the means for processing data is further programmed to retrieve the characteristic data and the first condition value stored in the means for storing data, generate a second condition value using the characteristic data and the vibration data, and compare the first and second condition values.

4. A system for analyzing a condition of a machine having moving parts, said system comprising:
   a.) a measuring point attached to the machine, the measuring point comprising:
      a memory device;
      a measuring point connector; and
      a measuring point receiver/transmitter connected to the memory device; and
   b.) an analysis apparatus comprising:
      an analysis apparatus connector constructed to mechanically engage the measuring point connector so that vibrations of the machine are transferred to the analysis apparatus connector;
      an accelerometer connected to receive the vibrations of the machine, and producing as an output vibration data;
      an analysis apparatus receiver/transmitter;
      a user-operable data entry device; and
      a processor connected to the accelerometer, the analysis apparatus receiver/transmitter, and the data entry device;
      wherein the processor is programmed to transmit characteristic data entered by the user through the analysis apparatus receiver/transmitter and the measuring point receiver/transmitter to the memory device on the measuring point, the characteristic data defining technical type values for at least one of the moving parts of the machine.

5. The system of claim 4, wherein the processor is further programmed to retrieve the characteristic data stored in the memory device, generate a first condition value using the characteristic data and the vibration data, and store the first condition value in the memory device.

6. The system of claim 5, wherein the processor is further programmed to retrieve the characteristic data and the first condition value stored in the memory device, generate a second condition value using the characteristic data and the vibration data, and compare the first and second condition values.

7. A method of analyzing a condition of a machine having moving parts, said method comprising the steps of:
   providing a measuring point attached to the machine, the measuring point comprising a memory device and a data transceiver;
   providing an analysis apparatus constructed to mechanically engage the measuring point, the analysis apparatus comprising a data transceiver, a processor, an accelerometer, and a user data entry device;
   engaging the analysis apparatus with the measuring point so that vibrations of the machine are transferred to the analysis apparatus and used by the accelerometer to generate vibration data;
   entering characteristic data that define technical type values for at least one of the moving parts of the machine through the data entry device;
   using the processor to generate a condition value based on the vibration data and the characteristic data;
   storing the condition value in the memory device; and
   storing the characteristic data in the memory device.

8. A method of analyzing a condition of a machine having moving parts, said method comprising the steps of:
   providing a measuring point attached to the machine, the measuring point comprising a memory device and a data transceiver, the memory device having stored therein characteristic data that define technical type values for at least one of the moving parts of the machine;
   providing an analysis apparatus constructed to mechanically engage the measuring point, the analysis apparatus comprising a data transceiver, a processor, an accelerometer, and a user data entry device;
   engaging the analysis apparatus with the measuring point so that vibrations of the machine are transferred to the analysis apparatus and used by the accelerometer to generate vibration data;
   retrieving the characteristic data from the memory device;
   using the processor to generate a condition value based on the vibration data and the characteristic data; and
   storing the condition value in the memory device.

9. A method of analyzing a condition of a machine having moving parts, said method comprising the steps of:
   providing a measuring point attached to the machine, the measuring point comprising a memory device and a data transceiver, the memory device having stored therein characteristic data that define technical type values for at least one of the moving parts of the machine, and a reference condition value;
   providing an analysis apparatus constructed to mechanically engage the measuring point, the analysis apparatus comprising a data transceiver, a processor, an accelerometer, and a user data entry device;
   engaging the analysis apparatus with the measuring point so that vibrations of the machine are transferred to the analysis apparatus and used by the accelerometer to generate vibration data;
   retrieving the characteristic data from the memory device;
   retrieving the reference condition value from the memory device;
   using the processor to generate a current condition value based on the vibration data and the characteristic data; and
   comparing the reference condition value and the current condition value.

10. A system for analyzing a condition of a machine having moving parts, said system comprising:
    a measuring point attached to the machine, the measuring point comprising a connection coupling, an information carrier, and a measuring point communication interface; and
    an analysis apparatus comprising:
      a microprocessor;
      a non-volatile memory;
      a sensor unit constructed and arranged to connect to the connection coupling so that vibrations of the machine are transmitted to the sensor unit; and
      an analysis apparatus communication interface constructed and arranged uo allow bi-directional communication with the measuring point communication interface;
      wherein the non-volatile memory stores instructions adapted to be executed by the microprocessor to perform the steps of:
        calculating a condition value based on interpretation data related to the machine and measured vibration values from the sensor unit; and
        storing the calculated condition value in the information carrier of the measuring point as a reference value.

11. The system of claim 10, wherein the measuring point comprises first and second physically separate components individually attached to the machine, the first component comprising the connection coupling, the second component comprising the information carrier and the measuring point communication interface.

12. The system of claim 10, wherein the non-volatile memory additionally stores instructions adapted to be executed by the microprocessor to perform the steps of:
    requesting measured vibration values from the sensor unit;
    acquiring interpretation information and a condition reference value from the information carrier;
    calculating a condition current value based on the measured vibration values and the interpretation information; and
    producing a relation value based on the condition reference value and the condition current value.

13. The system of claim 12, wherein the measuring point comprises first and second physically separate components individually attached to the machine, the first component comprising the connection coupling, the second component comprising the information carrier and the measuring point communication interface.

14. The system of claim 12, wherein the relation value represents a division of the condition current value by the condition reference value.

15. The system of claim 12, wherein relation value represents a difference between the condition current value and the condition reference value.

16. A system for analyzing a condition of a machine having moving parts, said system comprising:
    a measuring point attached to the machine, the measuring point comprising a connection coupling, an information carrier, and a measuring point communication interface; and
    an analysis apparatus comprising:
      a microprocessor;
      a non-volatile memory;
      a sensor unit constructed and arranged to connect to the connection coupling so that vibrations of the machine are transmitted to the sensor unit; and an analysis apparatus communication interface constructed and arranged to allow bi-directional communication with the measuring point communication interface;

wherein the non-volatile memory stores instructions adapted to be executed by the microprocessor to perform the steps of:
- acquiring the interpretation information and the condition reference value from the information carrier;
- calculating a condition current value based on current measured vibration values from the sensor unit and the interpretation information; and
- producing a relation value based on the condition reference value and the condition current value.

17. The system of claim 16, wherein the condition reference value represents a condition of the machine at an earlier point in time.

18. The system of claim 16, wherein the measuring point comprises first and second physically separate components individually attached to the machine, the first component comprising the connection coupling, the second component comprising the information carrier and the measuring point communication interface.

19. The system of claim 16, wherein the relation value represents a division of the condition current value by the condition reference value.

20. The system of claim 16, wherein relation value represents a difference between the condition current value and the condition reference value.

21. A system for analyzing a condition of a machine having moving parts, said system comprising:
- a measuring point attached to the machine, the measuring point comprising a connection coupling, an information carrier, and a measuring point communication interface;
- means for analyzing the machine by measuring vibration of the machine through the connection coupling, reading information related to the machine from the information carrier through the measuring point communication interface, and determining a current state of the machine based on the measured vibration;
- wherein the measuring point comprises first and second physically separate components individually attached to the machine, the first component comprising the connection coupling, the second component comprising the information carrier and the measuring point communication interface.

22. The system of 21, wherein the information carrier contains information related to a measurement taken at the connection coupling of the first component.

23. A system for analyzing a condition of a machine having moving parts, comprising:
- a measuring point attached to the machine, the measuring point comprising a connection coupling, an information carrier, and a measuring point communication interface;
- a sensor unit comprising a vibration transducer, the sensor unit being structured to physically engage the connection coupling of the measuring point so that vibrations of the machine at the measuring point are transferred to the vibration transducer;
- an analysis apparatus comprising a microprocessor electrically connected to receive digital data corresponding to an output of the transducer, and an analysis apparatus communication interface connected to the microprocessor;
- wherein the system is arranged to allow bidirectional communication between the measuring point communication interface and the analysis apparatus communication interface, and wherein the measuring point communication interface and the analysis apparatus communication interface are constructed to allow the communication without ohmic contact therebetween.

24. The system of claim 23, wherein the measuring point communication interface and the analysis apparatus communication interface are constructed to communicate with one another by radio transmissions.

25. The system of claim 23, wherein the measuring point communication interface and the analysis apparatus communication interface are constructed to communicate with one another by optical transmissions.

26. The system of claim 25, wherein the optical transmissions comprise pulses of infrared light.

27. The system of claim 25, wherein the system is constructed to allow the bidirectional communication between the measuring point communication interface and the analysis apparatus communication interface while the sensor unit is physically engaged with the connection coupling of the measuring point.

28. A method for analyzing a condition of a machine having moving parts, the machine having a measuring point comprising a connection coupling, an information carrier, and a measuring point communication interface, the method comprising the steps of:
- connecting an analysis apparatus having a sensor unit comprising a vibration transducer to the measuring point so that vibrations of the machine at the measuring point are transferred to the vibration transducer;
- converting an output of the transducer to digital data;
- analyzing the digital data to produce a first condition value; and
- communicating the first condition value through an analysis apparatus communication interface and the measuring point communication interface to the information carrier;
- wherein the communication between the measuring point communication interface and the analysis apparatus communication interface is performed without ohmic contact therebetween; and
- wherein the measuring point comprises first and second physically separate components individually attached to the machine, the first component comprising the connection coupling, the second component comprising the information carrier and the measuring point communication interface.

29. The method of claim 28, further comprising the steps of:
- after communicating the first condition value to the information carrier, repeating the connecting, converting, and analyzing steps to produce a second condition value;
- communicating the first condition value from the information carrier to the analysis apparatus through the measuring point communication interface and the analysis apparatus communication interface; and
- comparing the first and second condition values.

30. A system for analyzing a condition of a machine having moving parts, said system comprising:
- a measuring point attached to the machine, the measuring point comprising a connection coupling, an information carrier, and a measuring point communication interface; and an analysis apparatus comprising:

a microprocessor;

a non-volatile memory;

a sensor unit constructed and arranged to connect to the connection coupling so that vibrations of the machine are transmitted to the sensor unit; and an analysis apparatus communication interface constructed and arranged to allow bi-directional communication with the measuring point communication interface without ohmic contact;

wherein the non-volatile memory stores instructions adapted to be executed by the microprocessor to perform the steps of:

calculating a condition value based on measured vibration values from the sensor unit; and storing the calculated condition value in the information carrier of the measuring point as a reference value.

31. The system of claim 30, wherein the measuring point comprises first and second physically separate components individually attached to the machine, the first component comprising the connection coupling, the second component comprising the information carrier and the measuring point communication interface.

32. The system of claim 30, wherein the non-volatile memory additionally stores instructions adapted to be executed by the microprocessor to perform the steps of:

requesting measured vibration values from the sensor unit;

acquiring a condition reference value from the information carrier;

calculating a condition current value based on the measured vibration values; and producing a relation value based on the condition reference value and the condition current value.

33. The system of claim 32, wherein the measuring point comprises first and second physically separate components individually attached to the machine, the first component comprising the connection coupling, the second component comprising the information carrier and the measuring point communication interface.

34. The system of claim 32, wherein the relation value represents a division of the condition current value by the condition reference value.

35. The system of claim 32, wherein relation value represents a difference between the condition current value and the condition reference value.

36. A system for analyzing a condition of a machine having moving parts, said system comprising:

a measuring point attached to the machine, the measuring point comprising a connection coupling, an information carrier, and a measuring point communication interface; and an analysis apparatus comprising:

a microprocessor;

a non-volatile memory;

a sensor unit constructed and arranged to connect to the connection coupling so that vibrations of the machine are transmitted to the sensor unit; and an analysis apparatus communication interface constructed and arranged to allow bi-directional communication with the measuring point communication interface without ohmic contact;

wherein the non-volatile memory stores instructions adapted to be executed by the microprocessor to perform the steps of:

acquiring the condition reference value from the information carrier;

calculating a condition current value based on current measured vibration values from the sensor unit; and producing a relation value based on the condition reference value and the condition current value.

37. The system of claim 36, wherein the condition reference value represents a condition of the machine at an earlier point in time.

38. The system of claim 36, wherein the measuring point comprises first and second physically separate components individually attached to the machine, the first component comprising the connection coupling, the second component comprising the information carrier and the measuring point communication interface.

39. The system of claim 36, wherein the relation value represents a division of the condition current value by the condition reference value.

40. The system of claim 36, wherein relation value represents a difference between the condition current value and the condition reference value.

41. A method for analyzing a condition of a machine having moving parts, the machine having a measuring point comprising a connection coupling, an information carrier, and a measuring point communication interface, the method comprising the steps of:

connecting an analysis apparatus having a sensor unit comprising a vibration transducer to the measuring point so that vibrations of the machine at the measuring point are transferred to the vibration transducer;

converting an output of the transducer to digital data;

analyzing the digital data to produce a first condition value; and communicating the first condition value through an analysis apparatus communication interface and the measuring point communication interface to the information carrier;

wherein the communication between the measuring point communication interface and the analysis apparatus communication interface is performed without ohmic contact therebetween; and wherein the connection coupling, the information carrier, and the measuring point communication interface are all arranged within a single component attached to the machine.

42. The method of claim 41, further comprising the steps of:

after communicating the first condition value to the information carrier, repeating the connecting, converting, and analyzing steps to produce a second condition value;

communicating the first condition value from the information carrier to the analysis apparatus through the measuring point communication interface and the analysis apparatus communication interface; and comparing the first and second condition values.

* * * * *

UNITED STATES PATENT AND TRADEMARK OFFICE
CERTIFICATE OF CORRECTION

PATENT NO. : 6,725,723 B2
DATED : April 27, 2004
INVENTOR(S) : Carsten Aronsson and Jarl-Ove Linberg It is certified that error appears in the above-identified patent and that said Letters Patent is hereby corrected as shown below:

<u>Title page,</u>
Item [56], References Cited, insert the following:

-- OTHER DOCUMENTS

Symbol, PPT 4600 Series Pen Terminals with Integrated Scanners, April 1996, 6 pages Dallas Semiconductor, DS2430A 256-Bit-1-Wire EEPROM, April 3, 1995, pp. 235-250 --

Signed and Sealed this

Twenty-fourth Day of August, 2004

JON W. DUDAS
*Director of the United States Patent and Trademark Office*